April 21, 1964 B. J. ZAJAC 3,130,372

RATIO DETECTOR WITH ZENER DIODE VOLTAGE REGULATOR

Filed July 28, 1960

INVENTOR
BLAIR J. ZAJAC

BY Glenn S. Ovcvik AGENT
Richard C. Reed
ATTORNEY

United States Patent Office 3,130,372

Patented Apr. 21, 1964

3,130,372
RATIO DETECTOR WITH ZENER DIODE VOLTAGE REGULATOR

Blair J. Zajac, 2440 Wagner St. SE., Washington, D.C.

Filed July 28, 1960, Ser. No. 46,037
2 Claims. (Cl. 329—130)
(Granted under Title 35, U.S. Code (1952), sec. 266)

The invention described herein may be manufactured and used by or for the Government of the United States of America for governmental purposes without the payment of any royalties thereon or therefor.

This invention relates in general to devices for use in converting frequency variations into amplitude variations and in particular to devices of the ratio detector variety.

Receivers adapted for narrow band frequency modulation operation generally employ an FM to AM converter such as a Travis discriminator, a Foster Seeley discriminator, or a ratio detector. While the function of each of these converters is substantially identical and each includes a tuned circuit input section, a rectifier section and an output section, each of these converters has its own structural and operational distinctions. For example, the rectifier sections and the output sections are similar in the Travis and Foser Seeley discriminators but the tuned circuit input sections differ. The Travis discriminator includes three tuned circuits in the input section while the Foster Seeley includes two tuned sections. In both of these discriminators, the diodes are poled, with respect to the input section, such that their D.C. output voltages buck each other and the output is taken across the load resistors connected in series to ground. Thus in operation when the received signal is at the resonant frequency of the discriminators, the output voltage is zero. Likewise, in the case of the Foster Seeley discriminator and the ratio detector, the tuned circuit input sections are substantially identical but in the case of the ratio detector the diodes are poled, with respect to the input section such that their D.C. output voltages add and the output, which is taken across the load resistances in parallel, is equal to the ratio of the relative contributions of the two diodes.

The ratio detector is now widely used for converting frequency modulation into amplitude modulation in FM receivers. One reason for its acceptance is its inherent insensitivity to amplitude modulation on the incoming signal. It will be appreciated, however, that the ratio detector as it is known in the prior art, is not insensitive to variation in amplitude of the input signal, per se. As in the case of other converter circuits, the ratio detector has heretofore been subject to numerous extraneous wave energy interference problems such as those presented by low flying aircraft, automotive ignition systems, etc., which effectively block out a large portion of the input signal for periods of varying duration. Consequently, while a limiter circuit preceding the ratio detector circuit is not necessary to eliminate amplitude modulation on the input signal, it is common in high quality FM receivers to include a limiter circuit.

Accordingly, it is an object of this invention to provide an improved ratio detector which is substantially insensitive to input signal strength fluctuations and to extraneous pulse noise.

It is another object of this invention to provide an improved ratio detector which has an inherent noise reduction characteristic and may be readily substituted for the limiter and ratio detector stages of a quality FM receiver.

Other objects of the invention will be appreciated upon a more comprehensive understanding of the invention for which reference is had to the following specification and the drawings wherein.

Briefly, the device of this invention is a ratio detector wherein means are provided for stabilization of the D.C. voltage difference between the cathode of one of the diodes in the rectifier section and the plate of the other diode. By stabilizing this voltage difference an effective control action is achieved and the ratio detector becomes substantially insensitive to signal strength fluctuations.

Figures 1, 2:
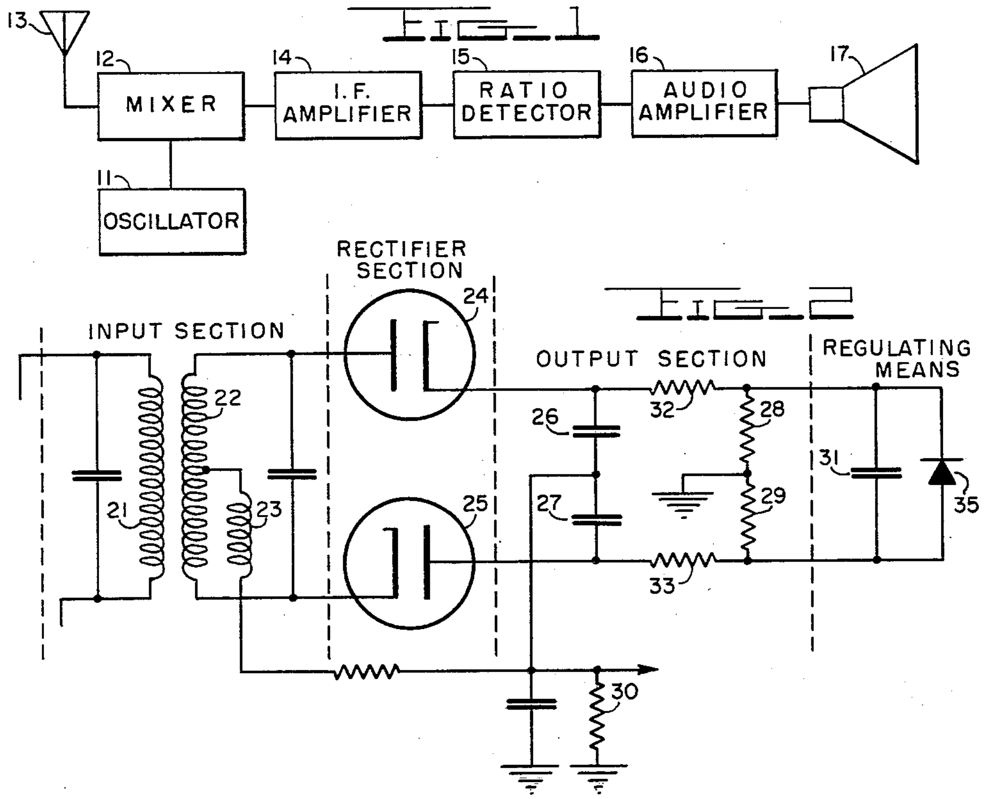
FIG. 1 is a block diagram of a basic FM receiver incorporating the device of the present invention.
FIG. 2 is a schematic showing of one embodiment of the invention.

FIG. 1 depicts a narrow band FM receiver including an oscillator 11, a mixer 12 for combining the input signal via the antenna 13 and the output of oscillator 11, an IF amplifier 14 tuned to pass a band of frequencies about a center frequency which may be the sum or difference frequencies about a center frequency which may be the sum or difference frequency in the output of the mixer 12, a ratio detector 15 in accordance with this invention for converting frequency deviations about said IF frequency into amplitude variations, an audio amplifier 16 for amplifying the output of said ratio detector and a speaker 17 for producing an audible display of said amplitude variations.

The ratio detector shown by way of example in FIG. 2 comprises, an input section, a tuned circuit transformer having a primary 21 and a center tapped secondary 22 with the center tap grounded for D.C. via the RF choke 23. As is well known, the operation of the ratio detector is based, in part, upon the phase relationship existing in the tuned secondary. In the transformer, the primary circuit is in series, for RF with each half of the secondary to ground. When the received signal is of the resonant frequency of the secondary, the RF voltage across one or the other half of the secondary is 90 degrees out of phase with that across the primary during each half cycle.

The rectifier section, the diodes 24 and 25, which may be the two halves of a 6AL5 vacuum tube, are connected, in essence, as half wave rectifiers across respective halves of the secondary 22, via an output section, the RC network, capacitance 26 and resistance 28 and the RC network, capacitance 27 and resistance 29, respectively, such that one diode produces a D.C. output voltage representative of frequency deviation from the carrier frequency in one direction and the other diode produces a D.C. voltage representative of frequency deviation in the opposite direction. The audio output voltage, taken across the load impedance 30 which is in the charge and discharge path of both the capacitances 26 and 27, is equal to the ratio of the relative contributions of the two diodes, hence the name ratio detector.

The capacitance 31 which is connected via the current limiting impedances 32 and 33 between the cathode of diode 24 and the plate of diode 25 is provided as a filtering means to remove noise in the form of amplitude modulation. It is recognized that this filtering means works well, particularly in conjunction with an A.V.C. feedback, not shown, for certain types of noise, i.e., constant level noise and slow increase and decrease of signal levels. However, the capacitance 31 does not serve as an effective filtering means in the case of pulse noise or in the case of a rapid variation in signal strength.

Considering the nonsymmetrical characteristics of a practical ratio detector, the voltage across the load impedance 30 must come to a new equilibrium each time the voltage across the capacitance 31 changes. The voltage across the capacitance 31, in the absence of any voltage regulation, is a function of input signal strength and is frequently employed in a feedback arrangement for A.V.C. purposes.

In accordance with this invention, a means for regulating the voltage across the capacitance 31 is introduced which effectively eliminates the readjustment of equilibrium across the load impedance 30 heretofore considered. In FIG. 2, the means for regulating the voltage across the capacitance 31 is a Zener diode 35 which is shown connected in shunt with the capacitance 31.

Figure 3:
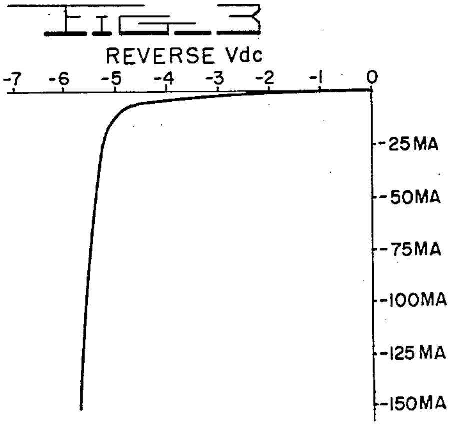
FIG. 3 is a graphical showing of a typical voltage v. current characteristic for a Zener diode.

The Zener diode has a reverse v. D.C.-current characteristic, such as shown in FIG. 3, which is ideally suited for regulation of the voltage across the filtering capacitance of a ratio detector. In Zener diode operation, the voltage across the diode remains substantially unchanged irrespective of the magnitude of the current flowing through the diode. As is well known, this type of diode is rated in terms of voltage range, current capacity, dynamic impedance, power dissipation and temperature coefficient. Selection of the proper type of Zener diode primarily depends upon the magnitude of the voltage desired across the charge capacitances 26 and 27. The maximum amount of ratio deviation is of course, a function of the voltage across the charge capacitances.

It has been found that by introduction of a Zener diode, which is characterized by a low dynamic resistance and low noise generation, in the manner described above, a receiver response analogous to automatic frequency control may be obtained. That is, in tuning an FM receiver which incorporates a ratio detector in accordance with this invention, the signal acts as though it is either there or not there. Moreover, no objectionable side effects, such as decrease in sensitivity, distortion etc. are observable. Moreover, the effective full limiting value of the receiver, that is, the point at which an increase in signal strength does not improve the receiver's final signal to noise ratio, is decreased. Thus a lesser signal input, for example 20$\mu$ volts instead of 25$\mu$ volts is necessary to obtain the desired condition of operation.

It will be appreciated that this invention is not restricted to devices which employ a Zener diode in shunt with the filtering capacitance and that any type of voltage regulator, solid state device or otherwise, having the requisite characteristics of a Zener diode may be substituted therefor. Furthermore, it is understood that this invention is not restricted to the ratio detector of the type exemplarily shown in the drawings and that other types of ratio detectors may be employed.

Finally, it is understood that this invention is only to be limited by the scope of the claims appended hereto.

What is claimed is:

1. A ratio detector for converting frequency modulation A.C. voltage into amplitude modulation D.C. voltage comprising an input section, an output section, a rectifier section with two oppositely poled rectifier elements each interconnecting said input and output sections, a capacitive element connected in shunt with said output section, and a Zener diode connected in shunt with said output section and said capacitive element, said Zener diode having a voltage characteristic which is a function of the optimum maximum ratio deviation whereby a limit is obtained for the maximum ratio deviation of the circuit.

2. The device as defined in claim 1 wherein the Zener diode has its voltage breakdown point at the optimum maximum ratio deviation voltage of the curcuit.

References Cited in the file of this patent

UNITED STATES PATENTS

| | | |
|---|---|---|
| 2,572,424 | Amos | Oct. 23, 1951 |
| 2,710,350 | Van Dijkum | June 7, 1955 |
| 2,945,950 | Midkiff | July 19, 1960 |
| 2,980,827 | Hill | Apr. 18, 1961 |
| 3,049,630 | Sapino | Aug. 14, 1962 |

OTHER REFERENCES

Electronics Design Magazine (pages 27, 29), March 19, 1958, "Zener Diode Characteristics."